(12) United States Patent
Yamaoka et al.

(10) Patent No.: US 11,703,833 B2
(45) Date of Patent: Jul. 18, 2023

(54) PROGRAM PROVIDING DEVICE, PROGRAM PROVIDING METHOD, AND PROGRAM PROVIDING SYSTEM

(71) Applicant: Mitsubishi Electric Corporation, Tokyo (JP)

(72) Inventors: Takayuki Yamaoka, Tokyo (JP); Chisato Ushida, Tokyo (JP); Kenji Mine, Tokyo (JP); Hirokazu Kikuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/785,407

(22) PCT Filed: Feb. 14, 2020

(86) PCT No.: PCT/JP2020/005898
§ 371 (c)(1),
(2) Date: Jun. 15, 2022

(87) PCT Pub. No.: WO2021/161534
PCT Pub. Date: Aug. 19, 2021

(65) Prior Publication Data
US 2023/0011646 A1   Jan. 12, 2023

(51) Int. Cl.
*G05B 19/418* (2006.01)

(52) U.S. Cl.
CPC .......... *G05B 19/41835* (2013.01); *G05B 2219/32361* (2013.01)

(58) Field of Classification Search
None
See application file for complete search history.

(56) References Cited

U.S. PATENT DOCUMENTS

2015/0128259 A1   5/2015   Suzuki et al.

FOREIGN PATENT DOCUMENTS

| CN | 102156840 A | 8/2011 |
| CN | 109791398 A | 5/2019 |
| JP | 2002-312506 A | 10/2002 |
| JP | 2007-213404 A | 8/2007 |
| JP | 2013-235504 A | 11/2013 |

OTHER PUBLICATIONS

International Search Report and Written Opinion dated Apr. 28, 2020, received for PCT Application PCT/JP2020/005898, filed on Feb. 14, 2020, 8 pages including English Translation.
Office Action dated Mar. 2, 2023 in corresponding Chinese Patent Application No. 202080096109.3. and English Translation thereof, 15 pages.

*Primary Examiner* — Carlos R Ortiz Rodriguez
(74) *Attorney, Agent, or Firm* — Xsensus LLP

(57) ABSTRACT

A server that is a program providing device includes: a provision processing unit that provides a program part constituting a control program being a program to be executed in a controller; an authentication unit that authenticates an operation simulation module being a program for simulatively performing operation in accordance with the program part on a basis of a result of verification on whether or not the operation simulation module can simulate operation of the controller to be performed by execution of the program part; and an operation checking unit that checks operation of the program part by using the authenticated operation simulation module.

10 Claims, 9 Drawing Sheets

FIG.4

| ID | PART TYPE | REGISTRATION DATE AND TIME | CREATOR | USE |
|---|---|---|---|---|
| **1 | AAA_FUNCTION BLOCK | 20// hh:mm | A | ZERO RETURN PROCESS AT ACTIVATION OF SERVOMOTOR |
| **2 | BBB_PROJECT FILE | 20// hh:mm | B | SAMPLE PROGRAM FOR WAREHOUSING AND DISPATCHING SYSTEM |
| **3 | CCC_LOGGING SETTING DATA | 20// hh:mm | C | LOGGING OF NUMBER OF COUNT-UPS OF DEVICES |
| ... | ... | ... | ... | ... |

FIG.6

| No. | DATA NAME (COMPARISON SOURCE) | DATA NAME (COMPARISON TARGET) | COMPARISON RESULT |
|---|---|---|---|
| 1 | ABCD | ABCD | IDENTICAL |
| 2 | EFGH | EFGH | IDENTICAL |
| ... | ... | ... | ... |

FIG.7

| No. | PROGRAM TO BE TESTED | INPUT OPERATION | RESULT | EXPLANATION |
|---|---|---|---|---|
| 1 | X0─┤├─Y10○ | TURN ON X0. | X0─┤├─Y10● | Y10 IS TURNED ON. |
| 2 | X0─┤├─Y10● | TURN OFF X0. | X0─┤├─Y10○ | Y10 IS TURNED OFF. |
| 3 | X10 X11─┤├─┤/├─Y20○, Y20─┤├─ | TURN ON X10. | X10 X11─┤├─┤/├─Y20●, Y20─┤├─ | Y20 IS TURNED ON. |
| 4 | X10 X11─┤├─┤/├─Y20●, Y20─┤├─ | TURN OFF X10. | X10 X11─┤├─┤/├─Y20●, Y20─┤├─ | Y20 IS UNCHANGED. |
| 5 | X10 X11─┤├─┤/├─Y20●, Y20─┤├─ | TURN ON X11. | X10 X11─┤├─┤/├─Y20○, Y20─┤├─ | Y20 IS TURNED OFF. |
| ⋮ | ⋮ | ⋮ | ⋮ | ⋮ |

PROGRAM PROVIDING DEVICE, PROGRAM PROVIDING METHOD, AND PROGRAM PROVIDING SYSTEM

CROSS-REFERENCE TO RELATED APPLICATION

The present application is based on PCT filing PCT/JP2020/005898, filed Feb. 14, 2020, the entire contents of which are incorporated herein by reference.

FIELD

The present disclosure relates to a program providing device, a program providing method, and a program providing system for providing program parts constituting control programs.

BACKGROUND

For creation of a control program for controlling a production facility, program parts that were previously created may be reused so as to improve the efficiency of work for program creation. For a system allowing an operator that creates a control program to obtain intended program parts from among previously created program parts, program providing systems that accumulate created program parts, search for program parts from among the accumulated program parts, and provide program parts that are found have been proposed.

One form of the program providing systems is the form of a marketplace in which program parts to be sold by sellers of program parts are collected, and program parts are sold to buyers of program parts. In the following description, a person or an organization that operates a program providing system may be referred to as a platformer, a person or an organization that brings program parts to a program providing system may be referred to as a producer, and a person or an organization that purchases program parts from a program providing system may be referred to as a consumer. A producer is also a person or an organization that creates program parts to be sold. A consumer is also a person or an organization that creates control programs by using purchased program parts. Note that a platformer, a producer, and a consumer refer to the roles played in a marketplace.

In order to make a program providing system function properly, a program providing system is required to guarantee that program parts provided to consumers operate normally. A consumer checks if provided program parts operate normally.

Patent Literature 1 discloses a distribution system in which a server of a system administrator that provides program distribution services includes a program running unit. According to the technology of Patent Literature 1, a consumer runs a program part in the program running unit to check the operation of the program part.

CITATION LIST

Patent Literature

Patent Literature 1: Japanese Patent Application Laid-open No. 2002-312506

SUMMARY

Technical Problem

In the case of the related art according to Patent Literature 1, there may be no guarantee that a controller that runs the program part performs the same operation as that of the program running unit included in the server. In the case of the related art, the consumer needs to check whether or not the operation confirmed in the server can also be implemented in the controller by using the actual computer or a simulator that simulates the operation of the controller. Thus, in the case of the related art, a consumer needs to check the operation of each of program parts obtained by the consumer when obtaining the program parts or when creating a control program, which increases the workload on consumers. If a platformer or a producer checks the operation of each of program parts brought to a program providing system so as to reduce the workload on consumers, the workload on the platformer or the producer increases. As described above, the related art is problematic in that the workload for checking the operation of program parts is heavy.

The present disclosure has been made in view of the above, and an object thereof is to provide a program providing device capable of reducing the workload for checking the operation of program parts.

Solution to Problem

In order to solve the above-mentioned problem and achieve the object, a program providing device according to the present disclosure includes a provision processing unit to provide a program part constituting a control program, the control program being a program to be executed in a controller; an authentication unit to authenticate an operation simulation module being a program for simulatively performing operation in accordance with the program part on a basis of a result of verification on whether or not the operation simulation module can simulate operation of the controller to be performed by execution of the program part; and an operation checking unit to check operation of the program part by using the authenticated operation simulation module.

Advantageous Effects of Invention

A program providing device according to the present disclosure produces an effect of enabling reduction in the workload for checking the operation of program parts.

BRIEF DESCRIPTION OF DRAWINGS

FIG. 4 is a table illustrating examples of attribute information stored in a part managing unit included in the server illustrated in FIG. 1.

FIG. 6 is a table illustrating an example of display of a result of comparison performed by the authentication unit of the server illustrated in FIG. 1.

FIG. 7 is a table for explaining a second example of the test performed by the authentication unit of the server illustrated in FIG. 1.

DESCRIPTION OF EMBODIMENTS

A program providing device, a program providing method, and a program providing system according to certain embodiments will be described in detail below with reference to the drawings. Note that the present disclosure is not limited to the embodiments.

First Embodiment

Figure 1:
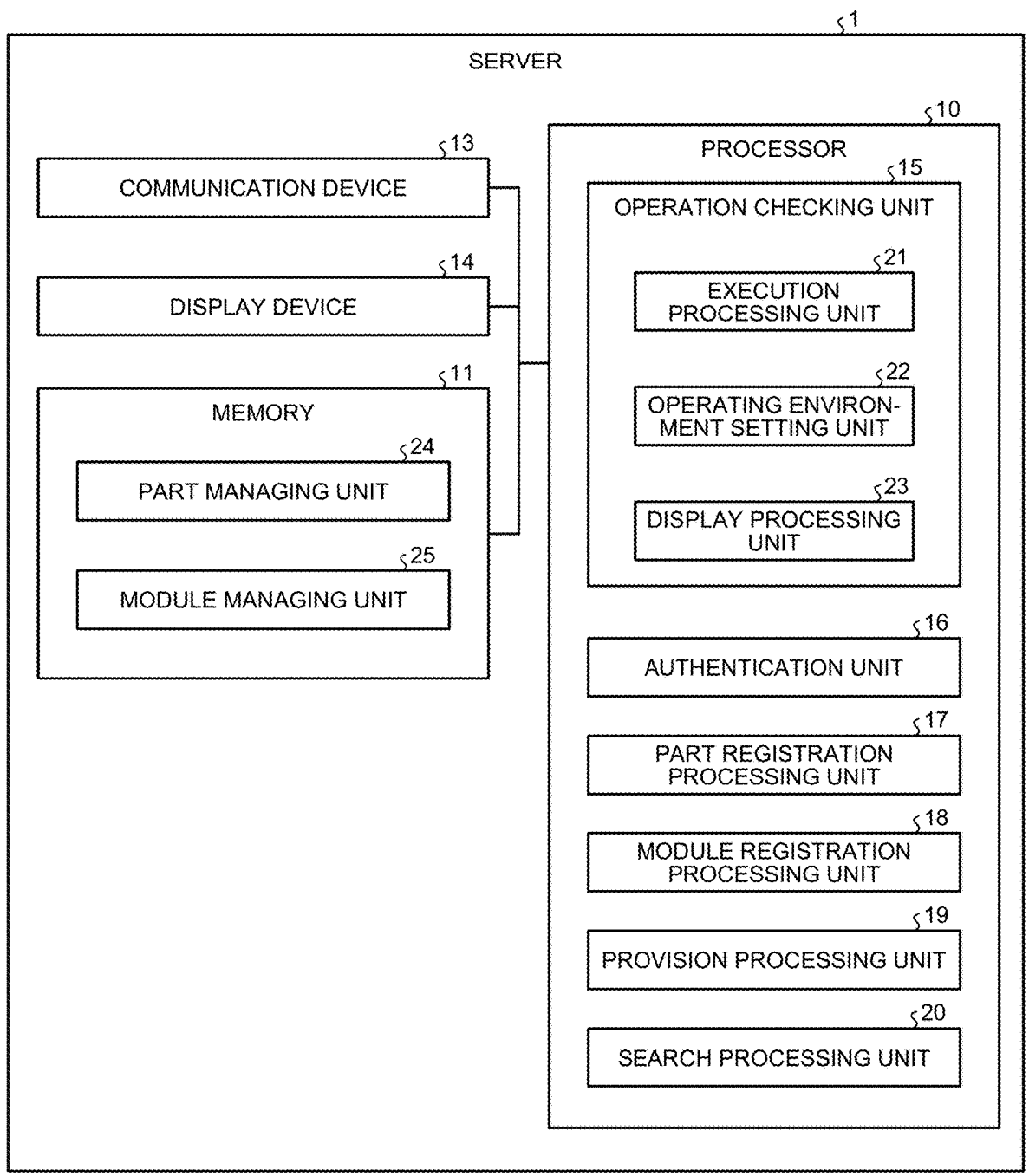
FIG. 1 is a block diagram illustrating a server that is a program providing device according to a first embodiment.
Figure 2:
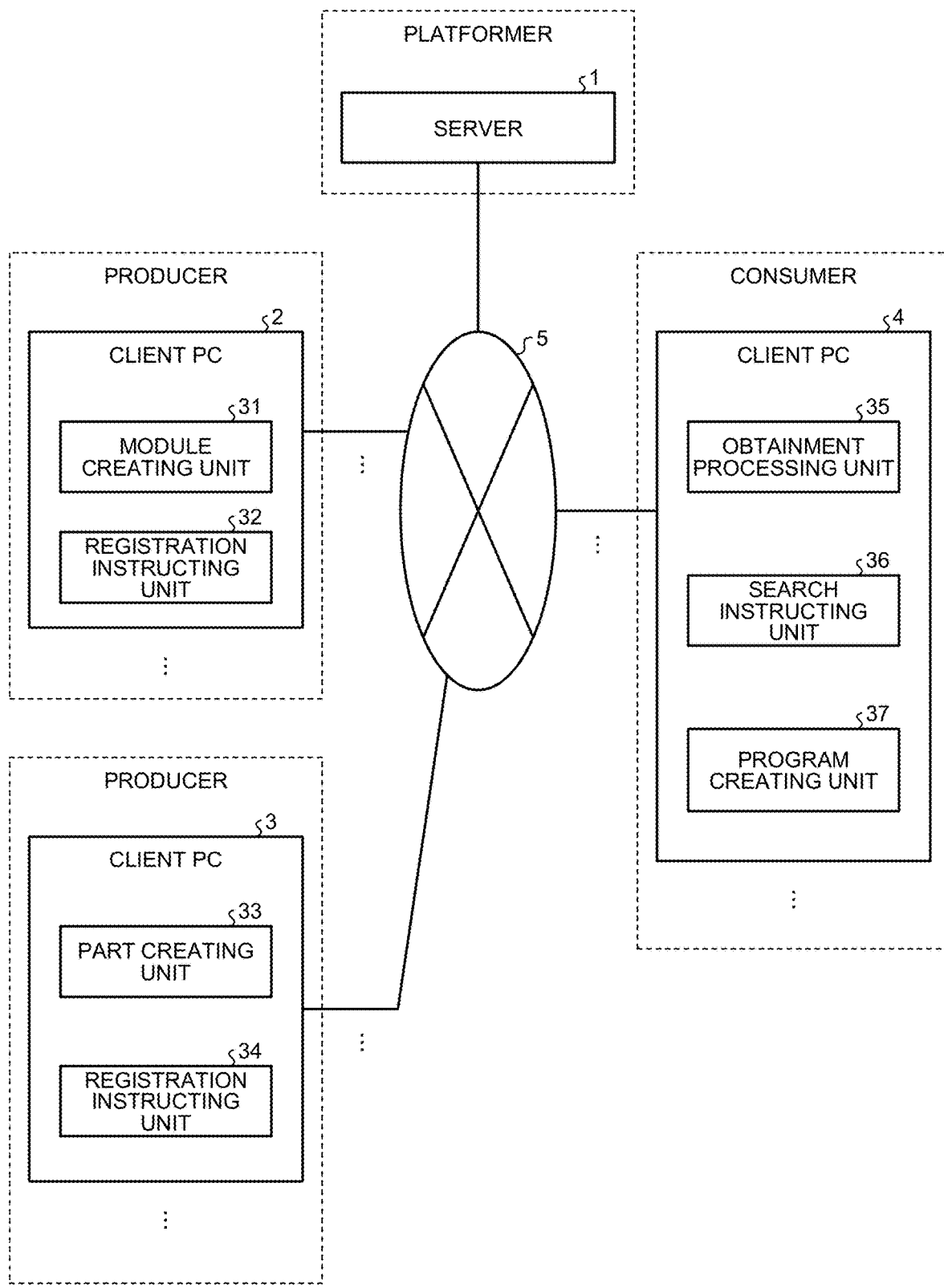
FIG. 2 is a configuration diagram of a program providing system including the server that is the program providing device according to the first embodiment.

FIG. 1 is a block diagram illustrating a server that is a program providing device according to a first embodiment. FIG. 2 is a configuration diagram of a program providing system including the server that is the program providing device according to the first embodiment.

An outline of the program providing system will be described. The program providing system is a system for providing program parts. The program providing system is a system in a form of a marketplace in which program parts from producers that create program parts are collected and program parts are sold to consumers. The program parts are programs that constitute a control program to be run by a controller. In addition, the program providing system collects operation simulation modules to be sold by producers that create operation simulation modules. An operation simulation module is a program for simulatively performing operation in accordance with a program part. A server 1, which is a program providing device according to the first embodiment, authenticates operation simulation modules. The server 1 checks the operation of a program part by using an authenticated operation simulation module among the operation simulation modules brought to be sold.

A program part includes description on the behavioral specification of the program part, and a module executable on the controller. A module may be source code. The controller is a device that controls a production facility by running control programs. A programmable logic controller (PLC) is an example of the controller. The controller is not illustrated.

The program providing system includes the server 1 and client PCs 2, 3, and 4. A platformer operates the program providing system by using the server 1. The server 1 accumulates program parts that have been created, searches for a program part from the accumulated program parts, and provides a found program part. A producer that creates operation simulation modules creates an operation simulation module by using a client PC 2. A producer that creates program parts creates a program part by using a client PC 3. A consumer creates a control program by using a client PC 4.

The server 1 and the client PCs 2, 3, and 4 are connected with each other via a network 5. For the network 5, any type of communication network such as the Internet, a local area network (LAN), or a virtual private network (VPN) can be used regardless of whether the network is wired or wireless.

Note that a plurality of producers that create operation simulation modules, a plurality of producers that create program parts, and a plurality of consumers participate in the marketplace. The program providing system includes a plurality of client PCs 2, a plurality of client PCs 3, and a plurality of client PCs 4.

Next, the configuration of the server 1 will be described. In the first embodiment, the server 1 is a computer such as a PC. Program for operating the program providing system are installed in the server 1. FIG. 1 illustrates a functional configuration of the server 1 and a hardware configuration for implementing the functional configuration of the server 1.

The server 1 includes a processor 10, which is a processing unit that performs various processes, a memory 11, which is a storage unit that stores information, a communication device 13 that performs transmission and reception of information to and from devices outside the server 1, and a display device 14 that displays information. Note that the processor 10 and the memory 11 illustrated in FIG. 1 may be individually included in different hardware configurations.

The processor 10 is a central processing unit (CPU). The processor 10 may be a processing device, a computing device, a microprocessor, a microcomputer, or a digital signal processor (DSP). Examples of the memory 11 include a random access memory (RAM), a read only memory (ROM), a flash memory, an erasable programmable read only memory (EPROM), an electrically erasable programmable read only memory (EEPROM: registered trademark), a hard disk drive (HDD), and a solid state drive (SSD). The programs for operating the program providing system are stored in the memory 11. The processor 10 executes the program stored in the memory 11.

The server 1 includes an operation checking unit 15, an authentication unit 16, a part registration processing unit 17, a module registration processing unit 18, a provision processing unit 19, and a search processing unit 20. The operation checking unit 15, the authentication unit 16, the part registration processing unit 17, the module registration processing unit 18, the provision processing unit 19, and the search processing unit 20 are each a functional unit implemented with use of the processor 10. The functions of the functional units are implemented by combination of the processor 10 and software. The functions may be implemented by combination of the processor 10 and firmware, or combination of the processor 10, software, and firmware. The software or firmware is described in the form of programs and stored in the memory 11. The processor 10 reads the software or the firmware. The processor 10 executes the software or the firmware.

The programs for operating the program providing system may be recorded on a storage medium that is readable by a computer. The server 1 may store the programs recorded on the storage medium in the memory 11. The storage medium may be a portable storage medium, which is a flexible disk, or a flash memory, which is a semiconductor memory. The programs for operating the program providing system may be installed in the server 1 from another computer via a communication network.

The communication device 13 receives information transmitted from the client PCs 2, 3, and 4, and transmits information to the client PCs 2, 3, and 4. The display device 14 is a display that displays information on a screen.

The memory 11 includes a part managing unit 24 that manages program parts registered in the server 1, and a module managing unit 25 that manages operation simulation modules registered in the server 1. Program parts created by the client PCs 3 are accumulated in the part managing unit 24. In addition, attribute information representing the attribute of each program part is stored in the part managing unit 24. Operation simulation modules created by the client PCs 2 are accumulated in the module managing unit 25.

The operation checking unit 15 checks the operation of a program part by using an authenticated operation simulation module. The operation checking unit 15 includes an execution processing unit 21 that executes an operation simulation module, and an operation environment setting unit 22 that sets information indicating an operating environment of the controller in the operation simulation module. The operation checking unit 15 simulates the operation of the controller resulting from running a program part in the operating environment set in the operation simulation module. In addition, the operation checking unit 15 includes a display processing unit 23 that performs a process for displaying a result of checking the operation.

The authentication unit 16 authenticates an operation simulation module created by a client PC 2 on a basis of a result of verification on whether or not the operation simulation module can simulate the operation of the controller resulting from running a program part. The authentication unit 16 authenticates an operation simulation module determined to be capable of simulating the operation of the controller.

The authentication unit 16 places a condition, for authentication, that the operation simulation module includes a security function. The security function is a function of determining whether or not a security problem is present in a program part. The authentication unit 16 further checks whether or not a security problem is present in the operation simulation module, and places a condition, for authentication, that no security problem is present.

The part registration processing unit 17 performs a process for registering a program part in accordance with a registration instruction from the client PC 3. The module registration processing unit 18 registers an operation simulation module in accordance with a registration instruction from the client PC 2. The provision processing unit 19 performs a process for providing a program part to the client PC 4. The search processing unit 20 performs search on program parts managed by the part managing unit 24. Note that at least some of the functional units included in the server 1 illustrated in FIG. 1 may be implemented by a cloud server.

Next, schematic configurations of the client PCs 2, 3, and 4 will be described. Among components of the individual client PCs 2, 3, and 4, components other than those necessary for description of the present disclosure will not be described.

The client PC 2 includes a module creating unit 31 that creates an operation simulation module, and a registration instructing unit 32 that generates a registration instruction for registering the created operation simulation module in the server 1. The functions of the module creating unit 31 are implemented by a processor included in the client PC 2 executing a program for creating an operation simulation module. The processor included in the client PC 2 is not illustrated. In the first embodiment, an operation simulation module is a simulator that simulates the operation of the controller.

The functions of the registration instructing unit 32 are implemented by the processor included in the client PC 2 executing an application for a producer. The application for a producer is an application for a producer that sells an operation simulation module to participate in the program providing system, and is provided by the platformer.

The client PC 3 includes a part creating unit 33 that creates a program part, and a registration instructing unit 34 that generates a registration instruction for registering the created program part in the server 1. The functions of the part creating unit 33 are implemented by a processor included in the client PC 3 executing an engineering tool. The engineering tool is a program for creating a control program. The processor included in the client PC 3 is not illustrated.

The functions of the registration instructing unit 34 are implemented by the processor included in the client PC 3 executing an application for a producer. The application for a producer is an application for a producer that sells a program part to participate in the program providing system, and is provided by the platformer.

The client PC 4 includes an obtainment processing unit 35 that performs a process for obtaining a program part from the server 1, a search instructing unit 36 that generates a search instruction for searching the program parts managed by the part managing unit 24, and a program creating unit 37 that creates a control program. The functions of the program creating unit 37 are implemented by a processor included in the client PC 4 executing an engineering tool. The engineering tool has a function of incorporating an obtained program part into a control program. The processor included in the client PC 4 is not illustrated.

The functions of the obtainment processing unit 35 and the functions of the search instructing unit 36 are implemented by the processor included in the client PC 4 executing an application for a consumer. The application for a consumer is an application for a consumer that is provided with a program part to participate in the program providing system, and is provided by the platformer.

Figure 3:
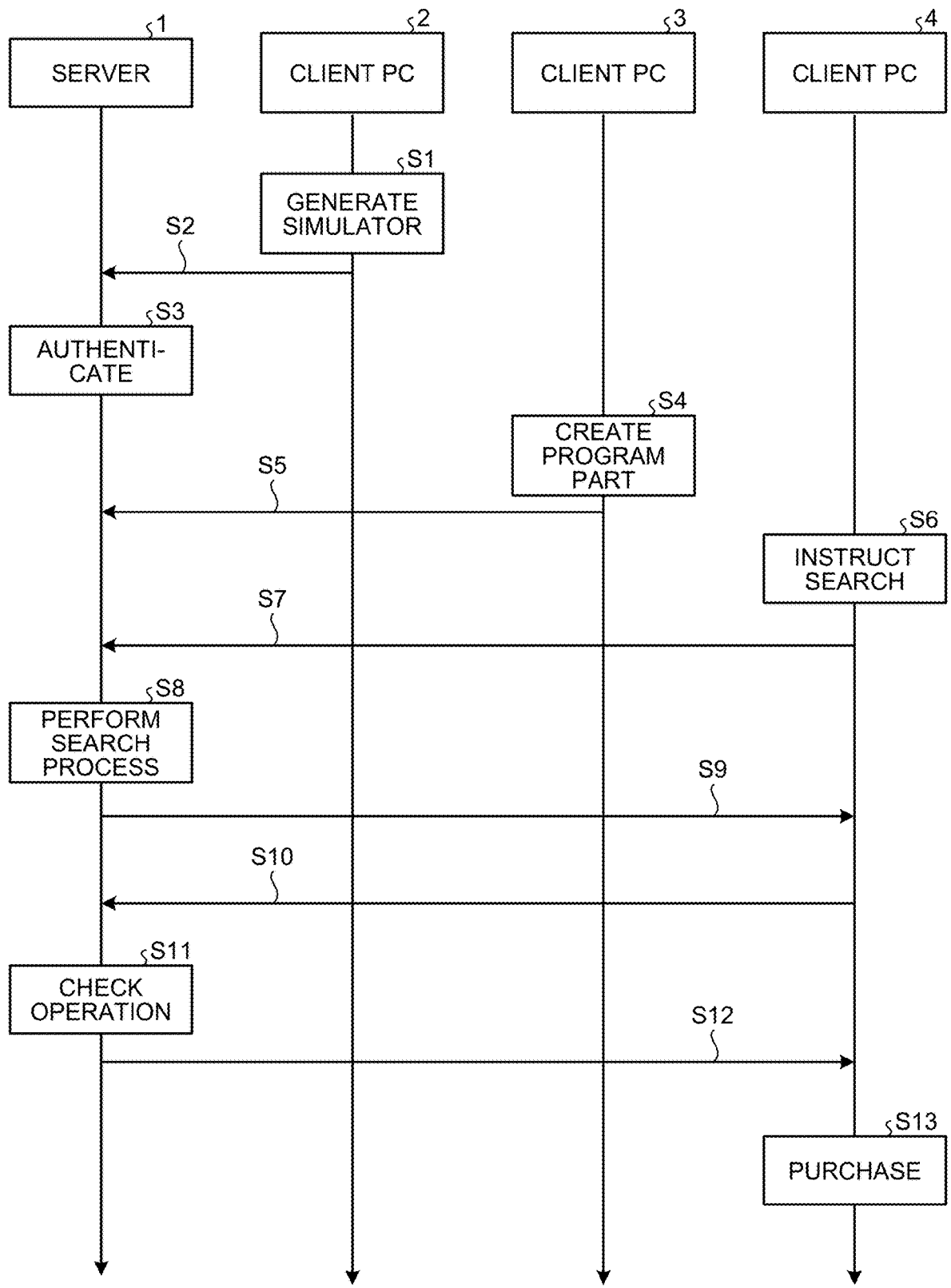
FIG. 3 is a diagram illustrating procedures of operations of the server and client personal computers (PCs) included in the program providing system illustrated in FIG. 2.

Next, operations of the server 1 and the client PCs 2, 3, and 4 will be explained. FIG. 3 is a diagram illustrating procedures of the operations of the server and the client PCs included in the program providing system illustrated in FIG. 2.

In step S1, the client PC 2 creates a simulator, which is an operation simulation module, by the module creating unit 31. In one example, the module creating unit 31 creates a dedicated simulator developed to be registered in the server 1. The simulator created by the module creating unit 31 is not limited to a dedicated simulator to be registered in the server 1, and may be developed as a simulator to be distributed as a product by a producer.

The registration instructing unit 32 of the client PC 2 generates a registration instruction for the simulator created in step S1. In step S2, the client PC 2 requests the server 1 to register the simulator by transmitting the registration instruction to the server 1. The module registration processing unit 18 of the server 1 registers the simulator transmitted from the client PC 2 by storing the simulator in the module managing unit 25.

In step S3, the server 1 performs a process for authentication of the registered simulator by the authentication unit 16. The authentication unit 16 verifies whether or not the simulator can simulate the operation of the controller by performing a system test specified in advance. Specifically, the authentication unit 16 performs a test for verifying whether or not an operation simulation module can simulate the operation of the controller. The system test may not be performed by the authentication unit 16 and may be performed by the producer that has created the simulator. In this case, the client PC 2 transmits the result of the system test to the authentication unit 16. Upon receiving the result of the system test, the authentication unit 16 verifies whether or not the simulator can simulate the operation of the controller on a basis of the obtained result. A specific example of the system test will be described later.

The authentication unit 16 authenticates a simulator that is determined to be capable of simulating the operation of the controller in the verification. The server 1 puts the simulator authenticated by the authentication unit 16 on the network 5.

In step S4, the client PC 3 creates a program part by the part creating unit 33. The registration instructing unit 34 of the client PC 3 generates a registration instruction for the program part created in step S4. In step S5, the client PC 3 requests the server 1 to register the program part by transmitting the registration instruction to the server 1. The part registration processing unit 17 of the server 1 registers the program part transmitted from the client PC 3 by storing the program part in the part managing unit 24. In the part managing unit 24, the attribute information of the program part is stored together with the program part.

FIG. 4 is a table illustrating examples of the attribute information stored in the part managing unit included in the server illustrated in FIG. 1. In the part managing unit 24, attribute information on attributes of "ID", "part type", "registration date and time", "creator", and "use".

The "ID" is information for identifying a program part. The "part type" is information indicating the type of a program part. The information on the "part type" includes information for identifying an engineering tool used in creation of the program part or information for identifying the controller, and information indicating a part attribute of the program part in a control program. For example, "AAA" in "AAA_function block" is the name of an engineering tool or a model name of the controller. The "function block" is the name of the part attribute. Note that the information for identifying an engineering tool or the information for identifying the controller is used for determining a simulator to be used in checking the operation of the program part.

The "registration date and time" is information on the date and time when the program part was registered in the server 1. The "creator" is information on the producer that has created the program part. The "use" is information indicating the intended use of the program part. The information on the "use" is used as a search word for narrowing down the program parts in searching the program parts.

The attribute information on the "part type", the "creator", and the "use" is input by the producer that has created the program part. The attribute information on the "ID" and the "registration date and time" is generated by the part registration processing unit 17 when the program part is registered. Not that the attribute information stored in the part managing unit 24 is not limited to that illustrated in FIG. 4. Attribute information on attributes other than those described in FIG. 4 may be stored in the part managing unit 24.

In step S6 illustrated in FIG. 3, the search instructing unit 36 of the client PC 4 generates a search instruction for searching the program parts registered in the server 1. The search instruction includes information on a specified search condition.

An input format for specifying the search condition is displayed on the client PC 4. The input format is provided by the marketplace. The input format includes a field for inputting the information on the part type and the search word for specifying the use. The input format may also include a field for specifying the creator of program parts, or a field for specifying the date and time when program parts were registered. The consumer inputs the condition on a desired program part into the input format by operating the client PC 4.

In step S7, the client PC 4 transmits the search instruction including the information on the specified search condition to the server 1. In step S8, the search processing unit 20 of the server 1 performs a search process in accordance with the search instruction. In step S9, the server 1 transmits a search result to the client PC 4.

In step S10, the obtainment processing unit 35 of the client PC 4 notifies the server 1 of a program part selected by the consumer from among program parts found by the search, and requests the server 1 to check the operation of the selected program part.

The execution processing unit 21 of the server 1 reads the simulator associated with the selected program part from the module managing unit 25 in accordance with the notification from the client PC 4. The execution processing unit 21 identifies the simulator associated with the selected program part from among simulators stored in the module managing unit 25 on the basis of the "part type" of the selected program part.

In step S11, the server 1 checks the operation of the program part by executing the program part by the execution processing unit 21. The operation checking unit 15 may set the operating environment of the operation of the controller in the operation environment setting unit 22. The operation environment setting unit 22 sets, as the operating environment, items such as the model name of the controller or a created program, for example. In step S12, the server 1 notifies the client PC 4 of the result of the operation check.

The client PC 4 presents the consumer the result of the operation check of which notification is provided from the server 1. The consumer gives an instruction to purchase the program part by operating the client PC 4. In step S13, the client PC 4 performs a procedure for purchasing the program part by the obtainment processing unit 35 by obtaining the program part in accordance with the instruction from the consumer. As described above, the consumer can check the operation of the program part at the controller before purchasing the program part.

Next, a specific example of verification performed by the authentication unit 16 will be explained. The authentication unit 16 verifies, through a system test, whether or not the simulator can normally operate in accordance with the behavioral specification in response to a preset command. The system test includes test on preset items. The number of items may be any number. Herein, an example of the test on two items will be explained.

Figure 5:
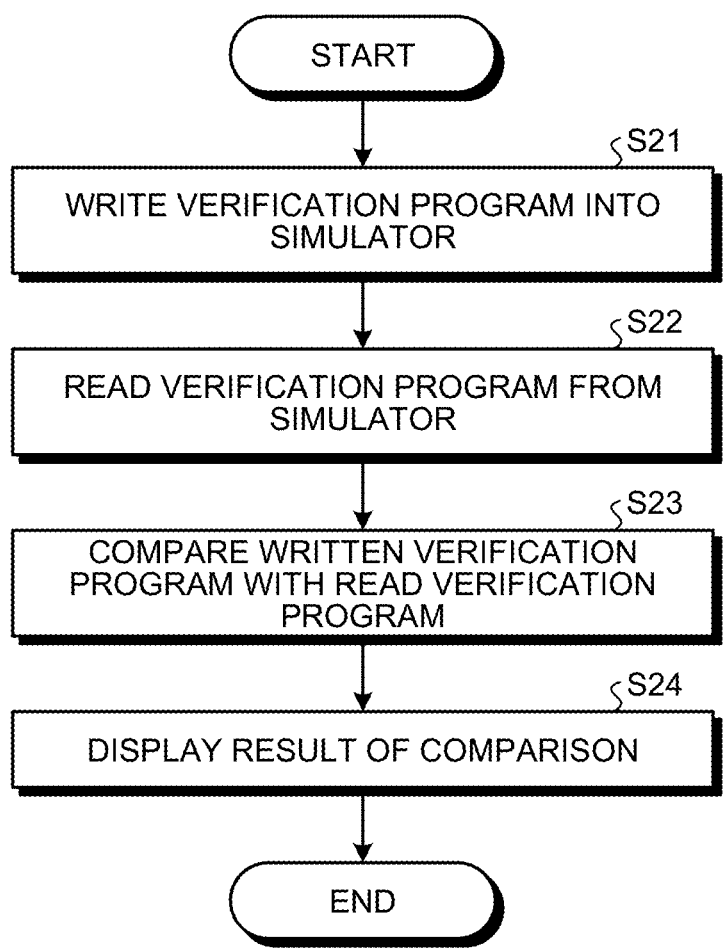
FIG. 5 is a flowchart for explaining a first example of a test performed by an authentication unit of the server illustrated in FIG. 1.

FIG. 5 is a flowchart for explaining a first example of the test performed by the authentication unit of the server illustrated in FIG. 1. In the test according to the first example, the authentication unit 16 verifies whether or not a verification program written in the simulator and the verification program read from the simulator after being written are identical to each other. Through this verification, the authentication unit 16 checks that a program is not unnecessarily rewritten from writing of the program in the simulator until reading of the program from the simulator. FIG. 5 illustrates procedures of the operations of the authentication unit 16 and the display device 14 in the test according to the first example.

In step S21, the authentication unit 16 writes a verification program into a simulator read from the module managing unit 25. In step S22, the authentication unit 16 reads the verification program written in step S21 from the simulator. In step S23, the authentication unit 16 compares the verification program written in step S21 with the verification program read in step S22. The authentication unit 16 transmits the result of comparison to the display device 14. In step S24, the display device 14 displays the result of comparison.

When the programs are identical to each other in the comparison in step S23, the authentication unit 16 determines that the verification program is not rewritten and the test is passed on this item. In contrast, when the programs are partially not identical to each other in the comparison in step S23, the authentication unit 16 determines a test failure on this item.

FIG. 6 is a table illustrating an example of display of the result of comparison performed by the authentication unit of the server illustrated in FIG. 1. Note that comparison source data refers to the verification program saved before being written in the simulator. Comparison target data refers to the verification program saved after being read from the simulator. FIG. 6 illustrate an example of display of the comparison result for each program file. A data name refers to the name of a program file. The display device 14 displays a comparison result of "identical" or "not identical" for each program file. In the example illustrated in FIG. 6, a comparison result of "identical" is displayed for a program file "ABCD", and a comparison result of "identical" is displayed for a program file "EFGH".

FIG. 7 is a table for explaining a second example of the test performed by the authentication unit of the server illustrated in FIG. 1. In the test according to the second example, the authentication unit 16 verifies whether or not a result of executing a program to be tested in the simulator is identical to an operation result of executing the program to be tested by the actual controller. FIG. 7 illustrates an example of a ladder program, which is a program to be tested.

Program codes created in a ladder language include circuit symbols and variables, which are basic components. The circuit symbols include junction points and coils for expressing processing in the controller. The variables represent objects to be controlled by the control program, which are objects of processing expressed by the circuit symbols. The variables are described in combination of alphabets representing the types of components and numbers for identifying the components. The variables are associated with individual data areas of a work area in a memory of the controller. Operation data for each component are stored in the individual data areas. The operation data include bit data expressing ON or OFF, and word data expressing numerical values. A number included in the variables is freely assigned to each object of processing.

In a ladder program "No. 1" illustrated in FIG. 7, assume that "X0" represents a device to which bit data is input, and a device value "Y10" is switched in conjunction with ON and OFF of "X0". The authentication unit 16 verifies, on the ladder program "No. 1", whether or not the simulator can reproduce the operation of the controller that an input operation to turn ON "X0" causes "Y10" to be turned ON. The authentication unit 16 verifies, on the ladder program "No. 2", which is the same as "No. 1", whether or not the simulator can reproduce the operation of the controller that an input operation to turn OFF "X0" causes "Y10" to be turned OFF. The authentication unit 16 also verifies, on each of a ladder program "No. 3" and subsequent ladder programs, an output result in response to an input operation in a manner similar to the verification on the ladder programs "No. 1" and "No. 2".

When the simulator can reproduce the operation of the actual controller, the authentication unit 16 determines that the test is passed on this item. In contrast, when the simulator cannot reproduce the operation of the actual controller, the authentication unit 16 determines a test failure on this item.

The authentication unit 16 further checks that the simulator has a security function and that the simulator has no security problem. The authentication unit 16 checks that the simulator has, as the security function, a function of detecting a computer virus in a program part. In addition, the authentication unit 16 checks that no computer virus is detected in the simulator so as to check that the simulator has no security problem.

The authentication unit 16 authenticate a simulator that has passes the test on all the items. Note that the test performed by the authentication unit 16 is not limited to that explained in the first embodiment. The test performed by the authentication unit 16 may be a test, other the aforementioned test, capable of verifying whether or not an operation simulation module can simulate the operation of the controller obtained by executing a program part.

The server 1 is capable of guaranteeing a program part provided to the consumer operates normally by checking the operation of the program part by the operation checking unit 15. In addition, because the operation simulation module used for the operation check is authenticated, the operation simulation module is guaranteed to be capable of simulating the operation of controller. Thus, the consumer can purchase a program part obtained from the server 1 with security. Because the consumer need not check the operation of each of program parts obtained by the consumer when obtaining the program parts or when creating a control program, the workload on the consumer for checking the operations can be reduced. In addition, because the platformer or the producer need not individually check the operations program parts brought into the program providing system, the workload on the platformer and the producers for checking the operations does not increase.

According to the first embodiment, the program providing device includes an authentication unit that authenticates an operation simulation module on the basis of a result of verification on whether or not the operation of the controller can be simulated, and an operation checking unit that checks the operation of a program part by using the authenticated operation simulation module, which produces an effect of enabling reduction in the workload for checking the operations of program parts.

Second Embodiment

Figure 8:
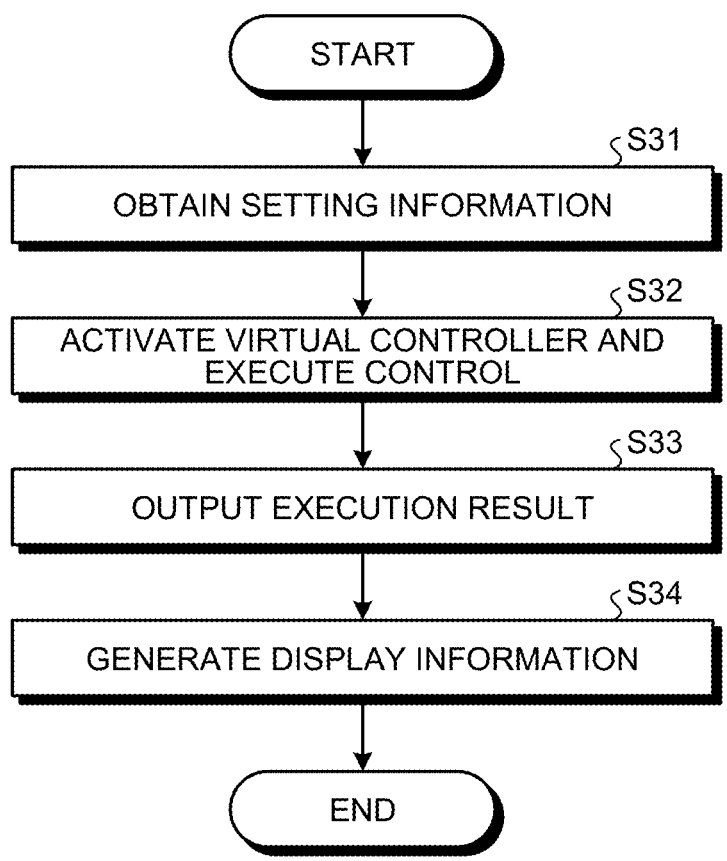
FIG. 8 is a flowchart illustrating an example of procedures of operation of a server, which is a program providing device, according to a second embodiment.

In a second embodiment, an example of the operation of the server 1 in checking the operation of a program part will be explained. FIG. 8 is a flowchart illustrating an example of procedures of the operation of the server, which is a program providing device, according to the second embodiment. In the second embodiment, components that are the same as those in the first embodiment described above will be represented by the same reference numerals, and features different from those in the first embodiment will be mainly described.

Assume that the obtainment processing unit 35 of the client PC 4 has obtained program parts from the part managing unit 24 of the server 1 before the procedures illustrated in FIG. 8. The client PC 4 transmits a project file to the server 1. The project file is a data file including a control program created by the program creating unit 37, and the obtained program parts.

The operation environment setting unit 22 of the server 1 reads the project file transmitted from the client PC 4. In step S31, the server 1 obtains, by the operation environment setting unit 22, setting information indicating the operating environment of the controller from the project file. The setting information includes the model name of the controller, connection information of the controller, various parameters set in the controller, and the like. The operation environment setting unit 22 provides the setting information to an operation simulation module to be executed by the execution processing unit 21.

In step S32, the server 1 activates, by the execution processing unit 21, a virtual controller, and executes control by the virtual controller. The execution processing unit 21 activates the virtual controller in accordance with an instruction from the client PC 4. The execution processing unit 21 executes control in accordance with the control program and the program parts provided from the operation environment setting unit 22. In step S33, the server 1 outputs an execution result, which is a result of control by the virtual controller, from the execution processing unit 21 to the display processing unit 23.

In step S34, the server 1 generates, by the display processing unit 23, display information for displaying a state of operation of the virtual controller on the basis of execution information obtained by execution of the control program and the program parts. The server 1 transmits the generated display information to the client PC 4.

The client PC 4 instructs the server 1 to start execution of the control by the virtual controller and to stop the execution by the virtual controller. In addition, the client PC 4 displays the execution result on a display device of the client PC 4 in accordance with the display information transmitted from the server 1. The client PC 4 may read the setting information set in the operation environment setting unit 22 from the server 1, and display the content of the setting information on the display device of the client PC 4. The consumer may check the content of the setting information set in the operation environment setting unit 22, and add the setting information by operating the client PC 4. The client PC 4 transmits the additional setting information to the server 1. In the operation environment setting unit 22, the setting information transmitted from the client PC 4 is added to the setting information obtained from the project file.

In a case where the state of operation of the virtual controller is different from an operation state intended by the consumer, the consumer may modify the control program by the program creating unit 37. The client PC 4 transmits the modified control program to the server 1. The operation environment setting unit 22 updates the setting information on the basis of the control program transmitted from the client PC 4. The operation environment setting unit 22 provides the updated setting information to the operation simulation module.

The server 1 repeats the operation from step S32 to step S34 described above on the basis of the updated setting information. The server 1 and the client PC 4 may repeat the modification of the control program, the update of the setting information, and the operation from step S32 to step S34 until the operation state of the virtual controller becomes the same as the operation state intended by the consumer. As described above, the consumer can create a control program enabling desired operation.

According to the second embodiment, the program providing device checks, by the operation checking unit 15, the operation based on the setting information indicating the operating environment of the controller, which produces an effect of enabling operation check adapted to the operating environment of the controller.

Third Embodiment

Figure 9:
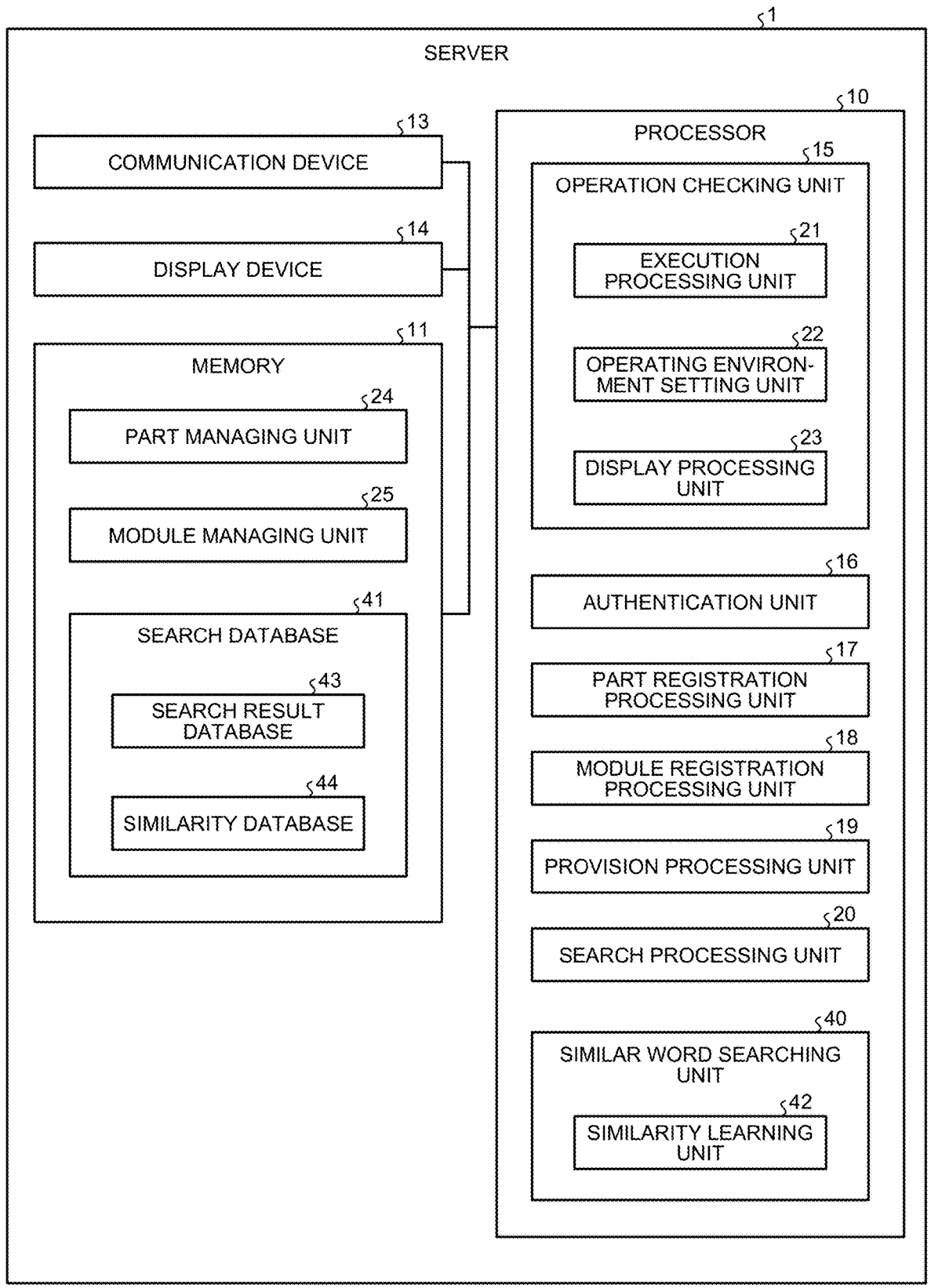
FIG. 9 is a block diagram illustrating a server that is a program providing device according to a third embodiment.

In a third embodiment, an example in which artificial intelligence (AI) is applied to the search for a program part in the server 1 will be described. FIG. 9 is a block diagram illustrating a server that is a program providing device according to the third embodiment. In the third embodiment, components that are the same as those in the first and second embodiments described above will be represented by the same reference numerals, and features different from those in the first and second embodiments will be mainly described.

The server 1 includes a similar word searching unit 40, which is a functional unit implemented with use of the processor 10. The similar word searching unit 40 searches for search words similar to an input search words from among search words that were previously used in searching for program parts. The functions of the similar word searching unit 40 are implemented by combination of the processor 10 and software. The functions of the similar word searching unit 40 may be implemented by combination of the processor 10 and firmware, or combination of the processor 10, software, and firmware.

The similar word searching unit 40 includes a similarity learning unit 42 that calculates the similarity between search words. The similarity learning unit 42 calculates the similarity between search words by applying a method for calculating similarity based on co-occurrence relations of words, or the like.

The memory 11 includes a search database 41 in which information on the search for program parts is accumulated. The search database 41 includes a search result database 43 in which search result data associated with search words and program parts are accumulated, and a similarity database 44 in which similarities calculated by the similarity learning unit 42 are accumulated. The search result database 43 is a search result data holding unit that holds search words input in searching for program parts when the program parts were provided, and search result data associated with the provided program parts. The similarity database 44 is a similarity holding unit that holds combinations of search words, and similarities between search words in combination.

The client PC 4 transmits a search instruction including a search word input by the consumer to the server 1. One or more search words are input to the client PC 4. For example, assume that three search words "a", "b", and "c" are input to the client PC 4. In the following description, a combination of input search words may be referred to as an input search word set. The search processing unit 20 outputs the input search word set "a, b, c" transmitted from the client PC 4 to the similar word searching unit 40.

The similar word searching unit 40 searches the search result data accumulated in the search result database 43 for search result data including the combination of search words that exactly matches with the input search word set. When search result data including the combination of search words that exactly matches with the input search word set is found, the similar word searching unit 40 sets the found search result data as a first candidate.

The similar word searching unit 40 reads, for each of the search words that are elements of the input search word set, a search word with the highest similarity among the search words held in the similarity database 44 from the similarity database 44. For example, when a search word with the highest similarity to "c", which is one element of the input search word set, is "d", the similar word searching unit 40 reads "d" from the similarity database 44.

Subsequently, the similar word searching unit 40 replaces the search word that is the element of the input search word set with the search word read from the similarity database 44, and searches for search result data including the combination of search words that matches with the input search word set with the replaced search word. When search result data including the combination of search words that matches with the input search word set with the replaced search word is found, the similar word searching unit 40 sets the found search result data as a second candidate. In the example described above, the input search word set with the replaced search word is "a, b, d". Note that the similar word searching unit 40 may read a plurality of search words from the similarity database 44, and search for search result data for each of a plurality of input search word sets with a replaced search words. The similar word searching unit 40 reads a plurality of search words with the highest similarity from among the search words held in the similarity database 44.

The search processing unit 20 outputs search result data, which is each of the candidates, to the communication device 13. The communication device 13 transmits the search result data to the client PC 4. The client PC 4 displays the search result data. The obtainment processing unit 35 of the client PC 4 requests the server 1 to check the operation of a program part included in each of the displayed search result data in accordance with the operation performed by the consumer. The operation checking unit 15 of the server 1 checks the operation of each program part in accordance with notification from the client PC 4. The server 1 notifies the client PC 4 of the result of checking the operation of each program part.

The client PC 4 presents the consumer the result of the operation check of which notification is provided from the server 1. The consumer gives an instruction to purchase the program part by operating the client PC 4. The search processing unit 20 adds the search result data relating to program parts purchased by the consumer into the search result database 43.

The similarity learning unit 42 calculates similarity between search words of the search result data added to the search result database 43. The similarity learning unit 42 updates the similarity between the search words by storing the calculated similarity values in the similarity database 44.

For example, assume that an input search word set input by the consumer is "a, b, c" and that a "program part a" associated with search words "a, b, d" in the search result database 43 is purchased by the consumer. The search processing unit 20 stores the search result data associated with the search words "a, b, d" and the "program part a" in the search result database 43. In addition, the similarity learning unit 42 obtains, as the similarity between "c" and "d" that have the same co-occurrence relation as three elements "a", "b", and "program part a" in the search result data, a value higher than the similarity between "c" and "d" stored in the similarity database 44. In other words, the similarity learning unit 42 performs update to increase the similarity between "c" and "d". Note that the program part search performed by the server 1 is not limited to that to which AI is applied. The server 1 may search for a program part without using AI.

According to the third embodiment, even when there is no search result data including a combination of search words that exactly matches an input search word set, the program providing device can search for a program part associated with a combination of search words with high similarity to the input search word set. The program providing device can appropriately search for a program part intended by a consumer, which can increase the efficiency of work for reuse of program parts.

The configurations presented in the embodiments above are examples of the present disclosure. The configuration in the embodiments can be combined with other known technologies. The configurations in the embodiments may be combined as appropriate. The configurations in the embodiments can be partly omitted or modified without departing from the scope of the present disclosure.

REFERENCE SIGNS LIST

1 server; 2, 3, 4 client PC; 5 network; 10 processor; 11 memory; 13 communication device; 14 display device; 15 operation checking unit; 16 authentication unit; 17 part registration processing unit; 18 module registration processing unit; 19 provision processing unit; 20 search processing unit; 21 execution processing unit; 22 operation environment setting unit; 23 display processing unit; 24 part managing unit; 25 module managing unit; 31 module creating unit; 32, 34 registration instructing unit; 33 part creating unit; 35 obtainment processing unit; 36 search instructing unit; 37 program creating unit; 40 similar word searching unit; 41 search database; 42 similarity learning unit; 43 search result database; 44 similarity database.

The invention claimed is:

1. A program providing device comprising:
   a provision processing circuitry to provide a program part constituting a control program configured to be executed in a controller;
   an authentication circuitry to authenticate an operation simulation program for simulatively performing operation in accordance with the program part on a basis of a result of verification on whether or not the operation simulation program can simulate operation of the controller to be performed by execution of the program part; and
   an operation checking circuitry to check operation of the program part by using the authenticated operation simulation program.

2. The program providing device according to claim 1, wherein the operation checking circuitry includes an operation environment setting circuitry to set information indicating an operating environment of the controller in the operation simulation program, and simulates operation of the controller to be performed by execution of the program part in the operating environment.

3. The program providing device according to claim 1, wherein the authentication circuitry performs a test for verifying whether or not the operation simulation program can simulate the operation of the controller.

4. The program providing device according to claim 1, further comprising:
   a search result data holding circuitry to hold search result data each associated with a search word used in searching for the program part when the program part was provided and the provided program part;
   a similarity holding circuitry to hold previously used combinations of search words, and similarities between search words included in the combinations; and
   a similar word searching circuitry to search for search result data including a search word similar to an input search word from among the search result data held by the search result data holding circuitry on the basis of the input search word and the similarities held by the similarity holding circuitry.

5. A program providing method for providing a program part constituting a control program by a computer, the control program being configured to be executed in a controller, the program providing method comprising:
   authenticating an operation simulation program being a program for simulatively performing operation in accordance with the program part on a basis of a result of verification whether or not the operation simulation program can simulate operation of the controller to be performed by execution of the program part; and
   checking operation of the program part by using the authenticated operation simulation program.

6. A program providing system comprising a program providing device to provide a program part constituting a control program configured to be executed in a controller, wherein
   the program providing device includes:
      an authentication circuitry to authenticate an operation simulation program being a program for simulatively performing operation in accordance with the program part on a basis of a result of verification on whether or not the operation simulation program can simulate operation of the controller to be performed by execution of the program part; and
      an operation checking circuitry to check operation of the program part by using the authenticated operation simulation program.

7. The program providing device according to claim 2, wherein the authentication circuitry performs a test for verifying whether or not the operation simulation program can simulate the operation of the controller.

8. The program providing device according to claim 2, further comprising:
   a search result data holding circuitry to hold search result data each associated with a search word used in searching for the program part when the program part was provided and the provided program part;
   a similarity holding circuitry to hold previously used combinations of search words, and similarities between search words included in the combinations; and
   a similar word searching circuitry to search for search result data including a search word similar to an input search word from among the search result data held by the search result data holding circuitry on the basis of the input search word and the similarities held by the similarity holding circuitry.

9. The program providing device according to claim 3, further comprising:
   a search result data holding circuitry to hold search result data each associated with a search word used in searching for the program part when the program part was provided and the provided program part;
   a similarity holding circuitry to hold previously used combinations of search words, and similarities between search words included in the combinations; and
   a similar word searching circuitry to search for search result data including a search word similar to an input search word from among the search result data held by the search result data holding circuitry on the basis of the input search word and the similarities held by the similarity holding circuitry.

10. The program providing device according to claim 7, further comprising:
   a search result data holding circuitry to hold search result data each associated with a search word used in searching for the program part when the program part was provided and the provided program part;
   a similarity holding circuitry to hold previously used combinations of search words, and similarities between search words included in the combinations; and
   a similar word searching circuitry to search for search result data including a search word similar to an input search word from among the search result data held by the search result data holding circuitry on the basis of the input search word and the similarities held by the similarity holding circuitry.

* * * * *